(12) United States Patent
Lee et al.

(10) Patent No.: US 11,323,945 B2
(45) Date of Patent: May 3, 2022

(54) METHOD FOR PERFORMING RANDOM ACCESS AND HANDOVER

(71) Applicant: Samsung Electronics Co., Ltd., Suwon-si (KR)

(72) Inventors: Namjeong Lee, Suwon-si (KR); Jaewon Kim, Seoul (KR); Jeongho Park, Seoul (KR); Peng Xue, Suwon-si (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 38 days.

(21) Appl. No.: 16/623,302

(22) PCT Filed: Jun. 15, 2018

(86) PCT No.: PCT/KR2018/006758
§ 371 (c)(1),
(2) Date: Dec. 16, 2019

(87) PCT Pub. No.: WO2018/230990
PCT Pub. Date: Dec. 20, 2018

(65) Prior Publication Data
US 2020/0178148 A1    Jun. 4, 2020

(30) Foreign Application Priority Data
Jun. 15, 2017    (KR) .................. 10-2017-0076140

(51) Int. Cl.
*H04W 36/38* (2009.01)
*H04W 56/00* (2009.01)
(Continued)

(52) U.S. Cl.
CPC .......... *H04W 36/38* (2013.01); *H04L 5/0007* (2013.01); *H04L 27/2605* (2013.01);
(Continued)

(58) Field of Classification Search
None
See application file for complete search history.

(56) References Cited

U.S. PATENT DOCUMENTS

2008/0267127 A1* 10/2008 Narasimha ........ H04W 36/0072
370/331
2014/0071930 A1    3/2014 Lee et al.
(Continued)

FOREIGN PATENT DOCUMENTS

KR    10-2017-0052499 A    5/2017
WO    2012150801 A2    11/2012
(Continued)

OTHER PUBLICATIONS

ISA/KR, International Search Report and Written Opinion of the International Searching Authority, International Application No. PCT/KR2018/006758, dated Sep. 21, 2018, 13 pages.
(Continued)

*Primary Examiner* — Scott M Sciacca

(57) ABSTRACT

The present disclosure relates to a 5G or pre-5G communication system for supporting a higher data transfer rate beyond a 4G communication system such as LTE. A method for controlling a cell change by a first base station according to an embodiment of the present invention comprises the steps of: generating resource information used for communication between a terminal and a second base station, when the terminal performs a cell change from a first cell corresponding to the first base station to a second cell corresponding to the second base station; and transmitting the resource information to the terminal so that the terminal and the second base station perform a random access procedure.

24 Claims, 5 Drawing Sheets

(51) Int. Cl.
- *H04W 74/08* (2009.01)
- *H04W 76/27* (2018.01)
- *H04L 5/00* (2006.01)
- *H04L 27/26* (2006.01)
- *H04W 24/10* (2009.01)
- *H04W 36/08* (2009.01)
- *H04W 74/02* (2009.01)

(52) U.S. Cl.
CPC ........... *H04W 24/10* (2013.01); *H04W 36/08* (2013.01); *H04W 56/001* (2013.01); *H04W 74/02* (2013.01); *H04W 74/0833* (2013.01); *H04W 76/27* (2018.02)

(56) References Cited

U.S. PATENT DOCUMENTS

| | | | |
|---|---|---|---|
| 2014/0226601 A1 | 8/2014 | Park et al. | |
| 2015/0036664 A1 | 2/2015 | Yuk et al. | |
| 2015/0181493 A1 | 6/2015 | Park et al. | |
| 2016/0128006 A1 | 5/2016 | Ji et al. | |
| 2017/0127334 A1 | 5/2017 | Park | |
| 2018/0084473 A1* | 3/2018 | Nagaraja | H04W 24/04 |
| 2018/0192335 A1* | 7/2018 | Bontu | H04W 36/24 |
| 2019/0357069 A1* | 11/2019 | Harada | H04W 24/10 |
| 2019/0387441 A1* | 12/2019 | Koskela | H04W 36/30 |
| 2020/0092855 A1* | 3/2020 | Seo | H04W 72/042 |
| 2020/0314721 A1* | 10/2020 | Cheng | H04W 36/0016 |
| 2020/0389917 A1* | 12/2020 | Kwak | H04W 74/04 |
| 2021/0084550 A1* | 3/2021 | Da Silva | H04W 36/0079 |

FOREIGN PATENT DOCUMENTS

| | | |
|---|---|---|
| WO | 2013043007 A2 | 3/2013 |
| WO | 2014017838 A1 | 1/2014 |

OTHER PUBLICATIONS

Intel Corporation, "NR random access procedure," R1-1706172, 3GPP TSG RAN WG1 #88bis, Spokane, WA, USA, Apr. 3-7, 2017, 8 pages.

Qualcomm [RAN1], "[Draft] LS on Wideband Operating Options," R1-1706497, 3GPP TSG-RAN WG1 Meeting #88bis, Spokane, WA, USA, Apr. 3-7, 2017, 1 page.

RAN1 [Qualcomm], "LS on Wideband Operating Options," R1-1706615, 3GPP TSG-RAN WG1 Meeting #88bis, Spokane, WA, USA, Apr. 3-7, 2017, 1 page.

Office Action dated Mar. 15, 2021 in connection with Korean Patent Application No. 10-2017-0076140, 9 pages.

* cited by examiner

METHOD FOR PERFORMING RANDOM ACCESS AND HANDOVER

CROSS-REFERENCE TO RELATED APPLICATIONS

This application is a 371 National Stage of International Application No. PCT/KR2018/006758, filed Jun. 15, 2018, which claims priority to Korean Patent Application No. 10-2017-0076140, filed Jun. 15, 2017, the disclosures of which are herein incorporated by reference in their entirety.

BACKGROUND

1. Field

The disclosure relates to operations of a base station and a terminal in random access and handover.

2. Description of Related Art

To meet the increased demand for wireless data traffic since the deployment of 4G communication systems, efforts have been made to develop an improved 5G or pre-5G communication system. Therefore, the 5G or pre-5G communication system is also called a "Beyond 4G Network" or a "Post LTE System".

Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), Full Dimensional MIMO (FD-MIMO), array antenna, analog beam forming, and large scale antenna techniques are being discussed for the 5G communication system.

In addition, in the 5G communication system, there are developments under way for system network improvement based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation, and the like.

In the 5G system, Hybrid FSK and QAM Modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

SUMMARY

The disclosed embodiments aim to provide operations of a base station and a terminal in random access and handover procedures. In particular, the disclosed embodiments aim to provide a method of mutual agreement for a control resource set (CORESET) between a base station and a terminal in order for the terminal to receive a response from the base station in an initial access, handover (HO), and random access (RA) procedure.

According to an embodiment of the disclosure, a cell switching control method of a first base station in a wireless communication system includes generating resource information for use in communication between a terminal and a second base station based on cell switching of the terminal from a first cell corresponding to the first base station to a second cell corresponding to the second base station and transmitting the resource information to the terminal, which performs a random access procedure with the second base station.

Preferably, the resource information may be transmitted via a radio resource control (RRC) message. Preferably, the resource information may include at least one of information on a CORESET in which a response is transmitted to the terminal by the second base station and information on random access channel (RACH) resources for use in the random access procedure with the second base station.

Preferably, the information on the CORESET may include at least one of information on resources for the second base station to transmit the response (UL grant) in reply to a physical random access channel (PRACH) preamble transmitted by the terminal and information on resources for the second base station to transmit ACK information in reply to a handover confirmation message transmitted by the terminal.

Preferably, the cell switching control method of a first base station may further include receiving a measurement report from the terminal.

According to an embodiment of the disclosure, a cell switching method of a terminal in a wireless communication system includes receiving resource information for use in communication between the terminal and a second base station from a first base station based on cell switching of the terminal from a first cell corresponding to the first base station to a second cell corresponding to the second base station and performing a random access procedure with the second base station based on the resource information.

Preferably, the resource information may be received via a radio resource control (RRC) message. Preferably, the resource information may include at least one of information on a CORESET in which a response is transmitted to the terminal by the second base station and information on random access channel (RACH) resources for use in the random access procedure with the second base station.

Preferably, the information on the CORESET may include at least one of information on resources for the second base station to transmit the response (UL grant) in reply to a physical random access channel (PRACH) preamble transmitted by the terminal and information on resources for the second base station to transmit ACK information in reply to a handover confirmation message transmitted by the terminal.

Preferably, the cell switching method of a terminal may further include transmitting a measurement report to the first base station.

According to an embodiment of the disclosure, a first base station for controlling cell switching in a wireless communication system includes a transceiver and a controller configured to control to generate resource information for use in communication between a terminal and a second base station based on cell switching of the terminal from a first cell corresponding to the first base station to a second cell corresponding to the second base station and control the transceiver to transmit the resource information to the terminal, which performs a random access procedure with the second base station.

According to an embodiment of the disclosure, a terminal for performing cell switching in a wireless communication system includes a transceiver and a controller configured to control the transceiver to receive resource information for use in communication between the terminal and a second base station from a first base station based on cell switching of the terminal from a first cell corresponding to the first base station to a second cell corresponding to the second base station and control to perform a random access procedure with the second base station based on the resource information.

The proposed methods according to the disclosed embodiments are advantageous in terms of allowing a terminal to acquire accurate CORESET information for use in receiving a response transmitted by a base station in an initial access and HO procedure.

DETAILED DESCRIPTION

Figure 1:
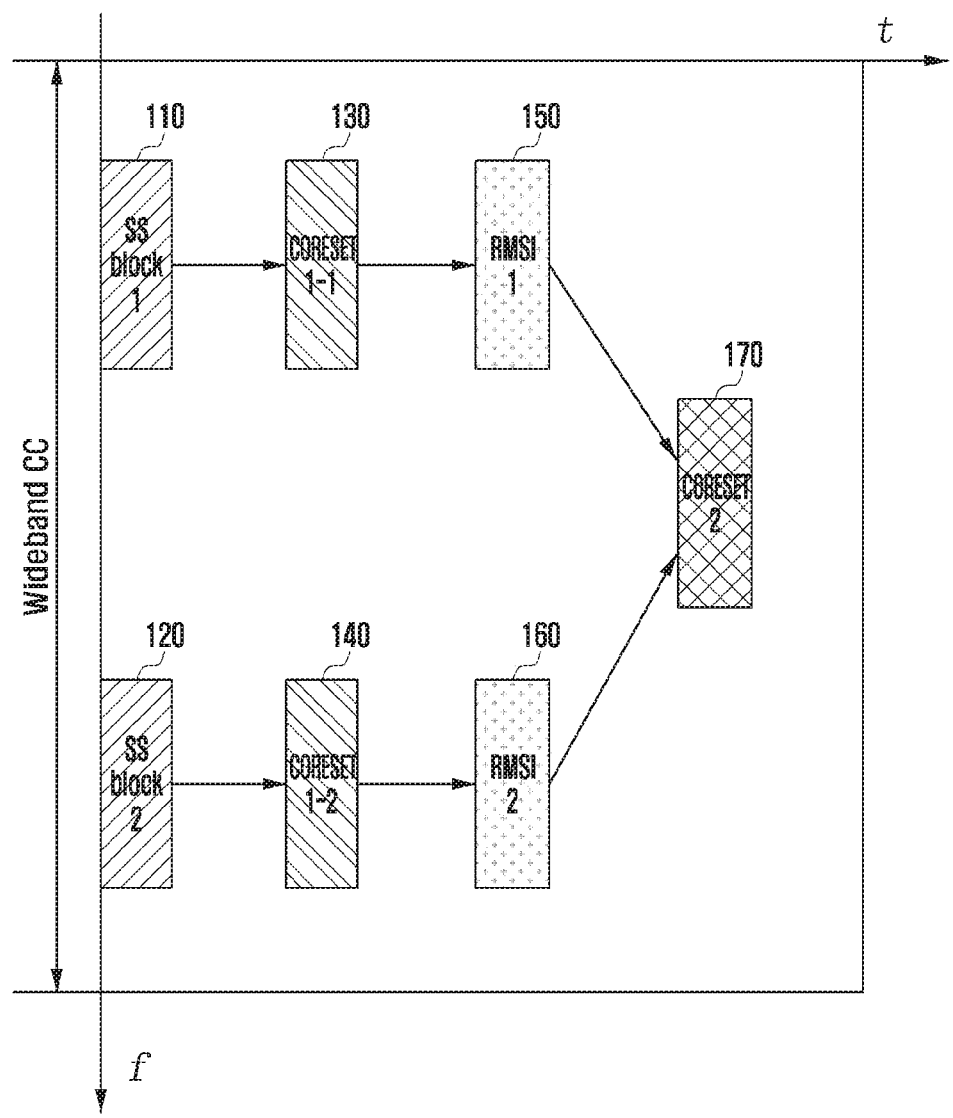
FIG. 1 is a diagram illustrating transmission of SS blocks, CORESETs, and RMSI within a wideband CC according to an embodiment of the disclosure.

Exemplary embodiments of the disclosure are described in detail with reference to the accompanying drawings. Detailed descriptions of technical specifications well-known in the art and unrelated directly to the disclosure may be omitted to avoid obscuring the subject matter of the disclosure. Further, the following terms are defined in consideration of the functionality in the disclosure, and they may vary according to the intention of a user or an operator, usage, etc. Therefore, the definition should be made on the basis of the overall content of the present specification.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

A new radio access network or new radio access technology (RAT) called NR assumes coexistence of UEs having different bandwidth (BW) communication capabilities (e.g., terminals with the 100 MHz communication capability and terminals supporting 1 GHz communication capability) and defines operation ranges according to the communication capabilities of the terminals, e.g., wideband component carrier (CC) and narrow band CC. A wideband CC may be composed of narrowband CCs and include multiple synchronization signal (SS) blocks.

[CORESET Configuration and CORESET for Msg2/4 Transmission in RA Procedure of Initial Access Terminal]

An initial access terminal needs information on CORESET for use in receiving grant information for Msg2/4 from a base station in a random access (RA) procedure. Here, CORESET means a time-frequency resource region in which the terminal performs blind decoding for a physical downlink control channel (PDCCH). The CORESET information is acquired from a master information block (MIB) and/or remaining minimum system information (RMSI).

MIB in a Synchronization Signal (SS) block may be used to configure CORESET for scheduling at least RMSI, which may also be used to configure a certain CORESET. The grant information for Msg2 and Msg4 may be transmitted in the CORESET configured via MIB or RMSI, which may be specified in the standard. For example, it may be possible to use one of the following schemes.

Alt 1. Search the CORESET configured in the MIB for receiving both Msg2 and Msg4

Alt 2. Search the CORESET configured in the RMSI for receiving both Msg2 and Msg4

Alt 3. Search the CORESET configured in the MIB for receiving Msg2 and the CORESET configured in the RMSI for receiving Msg4

If multiple SS blocks exist in a wideband CC, there may be multiple CORESETs and RMSIs associated with the corresponding SS blocks; in this case, the base station may determine a CORESET for use in transmitting a Msg2/4-related grant based on the resource block that the terminal has received.

The information (including RACH configuration) required for the initial access terminal to perform RA is carried in the RMSI

[Random Access Scheme of Initial Access Terminal]

If there are multiple CORESETs available for transmitting a grant related to Msg2 and/or Msg4 being transmitted from the base station to the terminal, it may be necessary to make clear the accurate location of the CORESET for grant information related to the Msg2 and/or Msg4 between the base station and the terminal. Alternative operations related to CORESET for Msg2- and Msg4-related grant information being communicated in the RA procedure of the initial access terminal are as follows:

Alt 1. Msg2/4-Related CORESET Location and RA Resource Mapping

The base station includes frequency location (or number) information of CORESET configured in the MIB and/or RMSI on an SS block within a wideband CC in the RACH configuration information. The base station may map the frequency location (or number) configured in the MIB and/or RMSI on the SS block to be received by the terminal to the RAC resource (time/frequency/sequence). Two alternative schemes may be considered as follows.

Alt 1-1. It may be possible to transmit one RACH configuration information in a wideband CC (i.e., transmit common RAC configuration information regardless of whether the number of RMSI is equal to or greater than 1) and define a mapping relationship between the location of CORESET for a grant related to Msg2/4 and RACH resources. That is, the CORESET that the terminal can read determines the RACH resources such that the base station transmits the Msg2/Msg4-related grant information within the CORESET based on the RACH resources that the terminal used for RA.

Alt 1-2. It may be possible to configure RACH resources for each of RACH configurations in multiple RMSIs being transmitted within a wideband CC. That is, the CORESET that the terminal can read determines the RACH resources such that the base station transmits the Msg2/Msg4-related grant information within the CORESET based on the RACH resources that the terminal used for RA.

Alt 2. Skipping Mapping Between Msg2/Msg4-Related CORESET Location and RA Resources In this case, the base station has to transmit Msg2 and Msg4 in the CORESET configured in the MIB and/or RMSI within all SS blocks. The UE receives the Msg2 and Msg4 in at least one of the CORESETs configured in the MIB and/or RMSI within the received SS block.

In the above Alts, if the MIB and/or RMSI frequency location in the SS block and the CORESET configured in the corresponding signal are in a 1:1 association, the frequency location information of CORESETs configured in the MIB and/or RMSI within the SS block may also carry the SS block and RMSI frequency location information.

FIG. 1 is a diagram illustrating transmission of SS blocks, CORESETs, and RMSIs within a wideband CC according to an embodiment of the disclosure.

A description is made of the transmission of SS blocks, CORESETs, and RMSIs on the basis of Alt 1-1 with reference to FIG. 1.

A mapping relationship between the CORESET location and RACH resources is defined for the case where one RACH configuration information is transmitted and multiple SS blocks (e.g., SS block 1 and SS block 2) exist within a wideband CC. The CORESET that the terminal can read determines RACH resources such that the base station may provide the terminal with the Msg2/Msg4-related information in the corresponding CORESET based on the RACH resources that the terminal used for RA.

Figure 2:
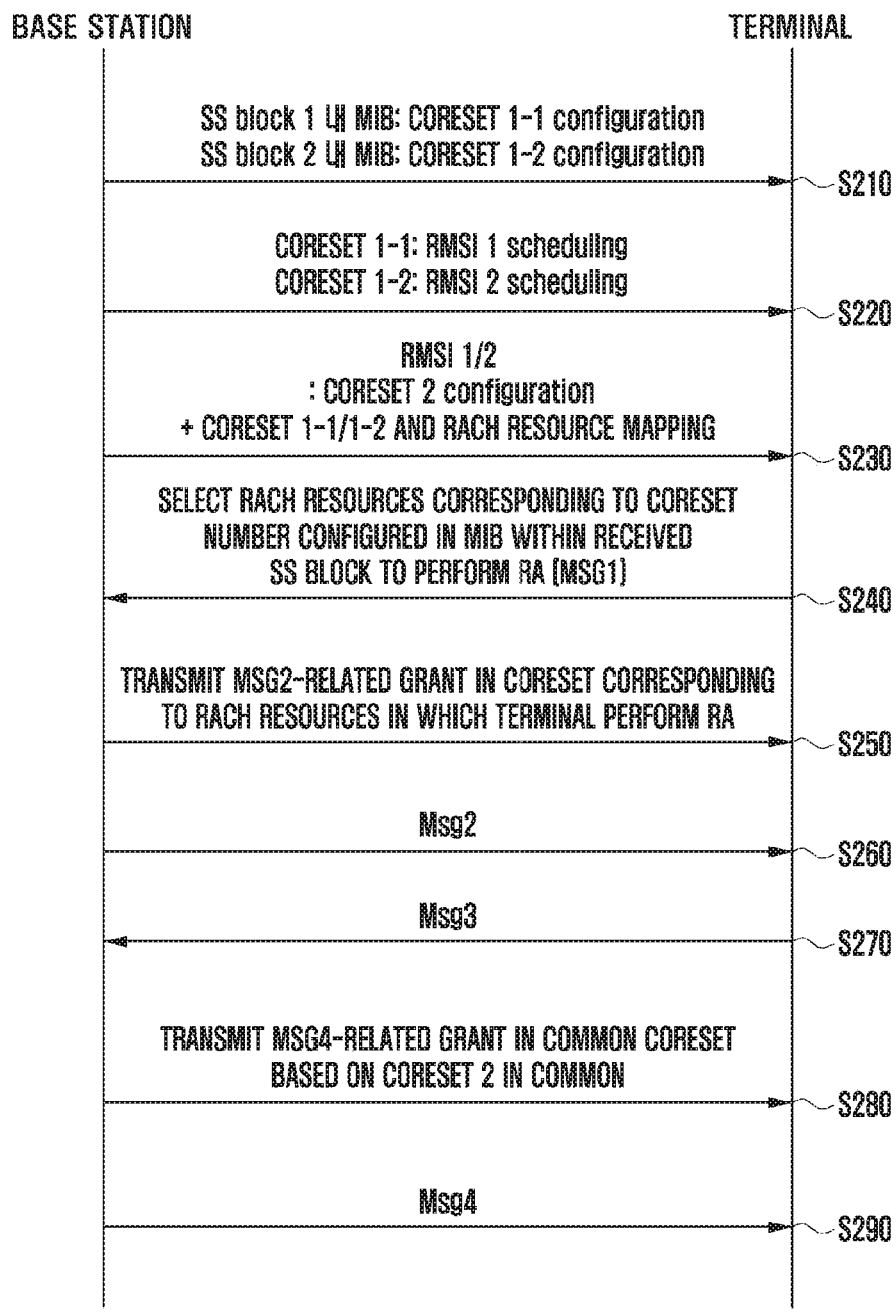
FIG. 2 is a signal flow diagram illustrating a random access procedure between an initial access terminal and a base station according to an embodiment of the present invention.

FIG. 2 is a signal flow diagram illustrating a random access procedure between an initial access terminal and a base station according to an embodiment of the present invention.

A description is made of the entire RA operation between a base station and a terminal on the basis of Alt 1-1 with reference to FIG. 2. In this embodiment, two SS blocks (SS block 1 and SS block 2) are transmitted within a wideband CC at step 210, the Msg2-related grant information is transmitted within the CORESET configured in the MIB, and different Msg2-related CORESETs are configured in the two different SS blocks.

At step S220, the Msg4-related grant information is transmitted within the CORESETs configured in the RMSIs, common Msg4-related CORESET is configured in two RMSIs (RMSI 1 and RMSI 2), and common RACH configuration information is carried in the two RMSIs.

At step S230, the CORESET 1-1/1-2 is mapped to the RACH resources based on the RACH configuration in the RMSI.

The terminal selects the RACH resources corresponding to the CORESET number configured in the MIB within the received SS block to perform RA at step S240. For RA, the UE transmits Msg1 to the base station. For example, after acquiring CORESET 1-1 configuration information from the SS block 1, the terminal may perform the RA on the RACH resources corresponding to the CORESET 1-1 according to the RACH configuration.

At step S250, the base station may transmit Msg2-related grant information within the CORESET (e.g., CORESET 1-1) corresponding to the RACH resources selected by the UE.

Afterward, the base station transmits, at step S260, Msg2 to the terminal based on the Msg2-related grant information, and the terminal transmits, at step S270, Msg3 to the base station in response to the Msg2.

At step S280, the base station transmits Msg4-related grant information to the terminal in the common CORESET. The Msg4-related grant information is transmitted in the CORESET (e.g., CORESET 2) configured in the RMSI regardless of which SS block the terminal received. At step S290, the base station transmits Msg4 to the terminal based on the Msg4-related grant information.

[HO Command for Terminal in HO and Random Access Scheme for Terminal in HO]

Figure 3:
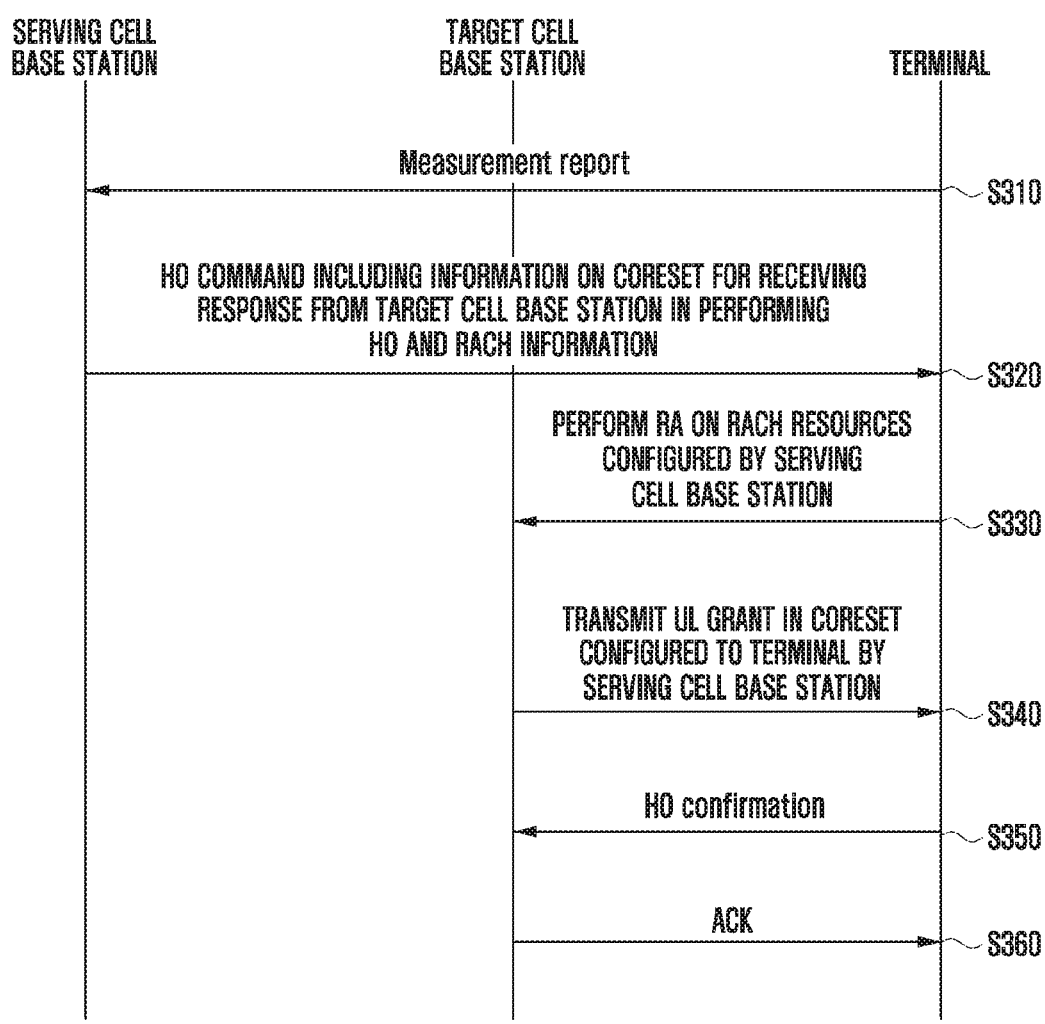
FIG. 3 is a signal flow diagram illustrating operations of serving and target cells and a terminal in handover according to an embodiment of the disclosure.

FIG. 3 is a signal flow diagram illustrating operations of serving and target cells and a terminal in HO according to an embodiment of the disclosure.

The terminal in HO basically performs non-contention-based RA for fast HO. Here, the terminal needs information on the CORESET that the terminal has to search to receive a response (UL grant) from the target cell base station in response to the PRACH preamble transmitted by the terminal and the CORESET in which the target cell base station transmits ACK information for HO confirmation.

In reference to FIG. 3, the terminal transmits a measurement report to the serving cell base station at step S310. Upon receipt of the measurement report transmitted by the terminal, the serving cell base station may transmit, at step S320, a HO command (RRC configuration message) including CORESET information to the terminal. The corresponding information may include CORESET configuration information including a CORESET start point (time), a CORESET frequency location, a number of OFDM symbols constituting the CORESET, a CORESET transmission interval, SS block index information of the target cell that is QCLed (Quasi Co-Located) with the CORESET (or CSI-RS resource information of the target cell that is QCLed with the CORESET), etc.

The CORESET frequency location may include a number of PRBs constituting the CORESET, an absolute value of the start point of the CORESET on the frequency axis (e.g., PRB number), or an offset value relative to the center frequency. The CORESET for the response (UL grant) from the target cell base station in reply to the PRACH preamble and the CORESET for the ACK information for the HO configuration may be separately configured.

The serving cell base station may include in the HO command the RACH configuration information for use by the terminal in HO along with the information on the CORESET that the terminal has to search in the HO procedure.

The terminal may perform, at step S330, RA based on the RACH information configured by the serving cell base station and receive, at step S340, a response transmitted by the target cell base station within the CORESET configured in the HO command (UL grant in the CORESET configured, by the serving cell base station, for the terminal). The target cell CORESET information that the serving cell base station includes in the HO command may indicate the CORESET corresponding to the SS block that the terminal receives in the course of performing measurement on the target cell.

If the information on the CORESET for use by the target cell base station in transmitting the response is not included in the HO command, the HO may be performed as follows. The terminal may directly receive the SS blocks and RMSIs being transmitted by the target cell base station to acquire corresponding CORESET location information for receiving the response from the target cell base station and, if the serving cell base station notifies the terminal of the SS block that the terminal has to receive for target cell measurement during the measurement configuration, it may be able to receive the response transmitted by the target cell base station within the CORESET corresponding to the SS block location for the measurement configuration during the RA procedure (i.e., the target cell base station also transmits the response at the corresponding CORESET location).

The serving cell base station may also include the information on the CORESETs available for the terminal to receive the response from the target cell base station and the RACH resources being mapped to the respective CORESETs in the HO command such that the terminal selects the RACH resources to perform RA and the target cell base station transmits the response in the CORESET corresponding to the RACH resources on which the terminal has performed the RA.

The terminal may transmit a HO confirmation message to the target cell base station at step S350 and receive an ACK corresponding to the HO confirmation message from the base station at step S360.

Figure 4:
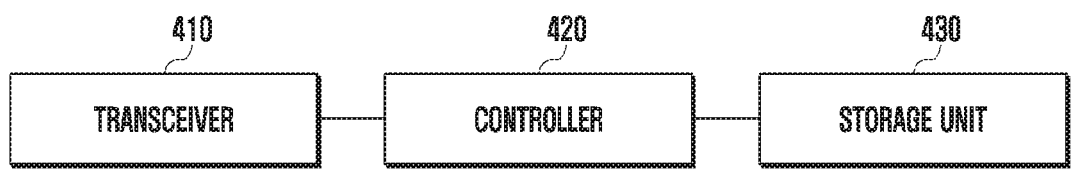
FIG. 4 is a block diagram illustrating a configuration of a terminal according to an embodiment of the disclosure.

FIG. 4 is a block diagram illustrating a configuration of a terminal according to an embodiment of the disclosure.

In reference to FIG. 4, the terminal may include a transceiver 410, a controller 420, and a storage unit 430. In the disclosed embodiment, the controller may be defined as a circuit, an application-specific integrated circuit, or at least one processor.

The transceiver 410 may communicate signals with network entities. The transceiver 410 may receive system information and synchronization signals or reference signals from a base station.

According to the disclosed embodiment, the controller 420 may control overall operations of the terminal. For example, the controller 420 may control signal flows among the components to implement the operations described with reference to the flowcharts. In detail, the controller 420 may control the operations proposed in the disclosed embodiments in order for the terminal in initial access or handover to acquire accurate CORESET information for use in receiving a response from the base station during the RA procedure.

The storage unit 430 may store at least one of information being transmitted/received by the transceiver 410 and information generated by the controller 420. For example the storage unit 430 may store CORESET configuration information.

Figure 5:
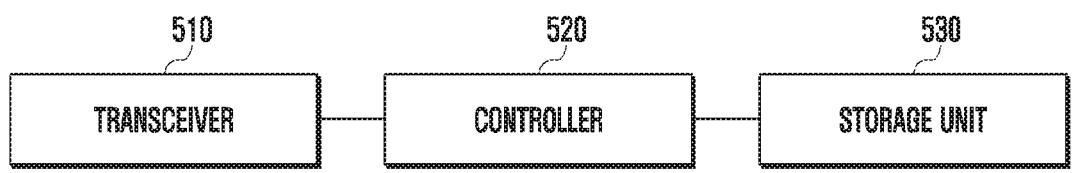
FIG. 5 is a block diagram illustrating a configuration of a base station according to an embodiment of the disclosure.

FIG. 5 is a block diagram illustrating a configuration of a base station according to an embodiment of the disclosure.

In reference to FIG. 5, the base station may include a transceiver 510, a controller 520, and a storage unit 530. In the disclosed embodiment, the controller may be defined as a circuit, an application-specific integrated circuit, or at least one processor.

The transceiver 510 may communicate signals with other network entities. For example, the transceiver 510 may transmit system information and synchronization signals or reference signals to terminals.

According to the disclosed embodiment, the controller 520 may control overall operations of the base station. For example, the controller 520 may control signal flows among the components to implement the operations described with reference to the flowcharts. In detail, the controller 520 may control the operations proposed in the disclosed embodiments in order for the terminal in initial access or handover to acquire accurate CORESET information for use in receiving a response from the base station during the RA procedure.

The storage unit 530 may store at least one of information being transmitted/received by the transceiver 510 and information generated by the controller 520.

The embodiments disclosed in the specification and drawings are proposed to help explain and understand the present invention rather than to limit the scope of the present invention. Thus the scope of the disclosure should be interpreted to include the disclosed embodiments and all possible variations and modifications derived therefrom on the basis of the technical principle of the disclosure.

The invention claimed is:

1. A method for controlling handover of a user equipment (UE) by a first base station in a wireless communication system, the method comprising:
    receiving, at the first base station, a measurement report from the UE; and
    transmitting, to the UE, a radio resource control (RRC) reconfiguration message indicating a handover to a second base station based on the received measurement report,
    wherein the RRC reconfiguration message further includes RACH configuration information for the second base station, the RACH configuration information configured by the first base station, and
    wherein the RRC reconfiguration message further includes CORESET configuration information of the second base station that indicates a CORESET resource of the second base station corresponding to a synchronization signal (SS) block received by the UE from the second base station.

2. The method of claim 1,
    wherein the CORESET configuration information includes at least one of a CORESET start point of the second base station, a CORESET frequency location of the second base station, a number of OFDM symbols constituting the CORESET of the second base station, a CORESET transmission interval of the second base station, or SS block index information of the second base station.

3. The method of claim 2, wherein the CORESET frequency location includes at least one of a number of PRBs constituting the CORESET, an absolute value of a start point of the CORESET on a frequency axis, or an offset value relative to a center frequency of the frequency axis.

4. The method of claim 1, wherein the RACH configuration information is a non-contention based resource.

5. The method of claim 1,
    wherein the SS block received by the UE from the second base station is received while the UE performs a measurement on the second base station to generate the measurement report.

6. A handover method of a user equipment (UE) in a wireless communication system, the method comprising:
    transmitting, to a first base station, a measurement report of the first base station;
    in response to the measurement report, receiving, from the first base station, a radio resource control (RRC) reconfiguration message indicating a handover to a second base station based on the transmitted measurement report; and
    performing a random access procedure with the second base station based on the RRC reconfiguration message,
    wherein the RRC reconfiguration message includes RACH configuration information for the second base station, the RACH configuration information configured by the first base station, and
    wherein the RRC reconfiguration message further includes CORESET configuration information of the second base station that indicates a CORESET resource of the second base station corresponding to a synchronization signal (SS) block received by the UE from the second base station.

7. The method of claim 6,
wherein the CORESET configuration information includes at least one of a CORESET start point of the second base station, a CORESET frequency location of the second base station, a number of OFDM symbols constituting the CORESET of the second base station, a CORESET transmission interval of the second base station, or SS block index information of the second base station.

8. The method of claim 7, wherein the CORESET frequency location includes at least one of a number of PRBs constituting the CORESET, an absolute value of the start point of the CORESET on a frequency axis, or an offset value relative to a center frequency.

9. The method of claim 6, wherein the RACH configuration information is a non-contention based resource.

10. The method of claim 6,
wherein the SS block received by the UE from the second base station is received while performing a measurement on the second base station to generate the measurement report.

11. The method of claim 6, the random access procedure comprising:
transmitting, to the second base station, random access preamble based on the RRC reconfiguration message; and
receiving, from the second base station, an uplink grant through a resource indicated by the RACH configuration information.

12. The method of claim 11, further comprising:
transmitting, to the second base station, a handover confirmation message.

13. A first base station for controlling handover of a user equipment (UE) in a wireless communication system, the first base station comprising:
a transceiver; and
a controller configured to:
control to the transceiver to receive a measurement report from the UE, and
control to the transceiver to transmit a radio resource control (RRC) reconfiguration message indicating a handover to a second base station based on the received measurement report,
wherein the RRC reconfiguration message further includes RACH configuration information for the second base station, the RACH configuration information configured by the first base station, and
wherein the RRC reconfiguration message further includes CORESET configuration information of the second base station that indicates a CORESET resource of the second base station corresponding to a synchronization signal (SS) block received by the UE from the second base station.

14. The first base station of claim 13,
wherein the CORESET configuration information includes at least one of a CORESET start point of the second base station, a CORESET frequency location of the second base station, a number of OFDM symbols constituting the CORESET of the second base station, a CORESET transmission interval of the second base station, or SS block index information of the second base station.

15. The first base station of claim 14, wherein the CORESET frequency location includes at least one of a number of PRBs constituting the CORESET, an absolute value of a start point of the CORESET on a frequency axis, or an offset value relative to a center frequency of the frequency axis.

16. The first base station of claim 13, wherein the RACH configuration information is a non-contention based resource.

17. The first base station of claim 13,
wherein the SS block received by the UE from the second base station is received while the UE performs a measurement on the second base station to generate the measurement report.

18. A user equipment (UE) for handover in a wireless communication system, the UE comprising:
a transceiver; and
a controller configured to:
control the transceiver to transmit, to a first base station, a measurement report of the first base station,
control the transceiver to receive, from the first base station, a radio resource control (RRC) reconfiguration message indicating a handover to a second base station based on the transmitted measurement report, and
perform a random access procedure with the second base station based on the RRC reconfiguration message,
wherein the RRC reconfiguration message includes RACH configuration information for the second base station, the RACH configuration information configured by the first base station, and
wherein the RRC reconfiguration message further includes CORESET configuration information of the second base station that indicates a CORESET resource of the second base station corresponding to a synchronization signal (SS) block received by the UE from the second base station.

19. The UE of claim 18,
wherein the CORESET configuration information a CORESET start point of the second base station, a CORESET frequency location of the second base station, a number of OFDM symbols constituting the CORESET of the second base station, a CORESET transmission interval of the second base station, or SS block index information of the second base station.

20. The UE of claim 19, wherein the CORESET frequency location includes at least one of a number of PRBs constituting the CORESET, an absolute value of the start point of the CORESET on a frequency axis, or an offset value relative to a center frequency.

21. The UE of claim 18, wherein the RACH configuration information is a non-contention based resource.

22. The UE of claim 18,
wherein the SS block received by the UE from the second base station is received while performing a measurement on the second base station to generate the measurement report.

23. The UE of claim 18, the random access procedure comprising:
transmitting, to the second base station, random access preamble based on the RRC reconfiguration message; and
receiving, from the second base station, an uplink grant through a resource indicated by the RACH configuration information.

24. The UE of claim 23, the controller further configured to:
 control to the transceiver to transmit, to the second base station, a handover confirmation message.

\* \* \* \* \*